US011502310B2

(12) United States Patent
Miles et al.

(10) Patent No.: US 11,502,310 B2
(45) Date of Patent: Nov. 15, 2022

(54) FLEXIBLE BATTERY

(71) Applicant: DST Innovations Limited, Bridgend (GB)

(72) Inventors: Anthony Miles, Bridgend (GB); Niladri Vyas, Bridgend (GB); Benjamin Masheder, Bridgend (GB); Stephen Hughes, Bridgend (GB)

(73) Assignee: DST Innovations Limited, Bridgend (GB)

( * ) Notice: Subject to any disclaimer, the term of this patent is extended or adjusted under 35 U.S.C. 154(b) by 225 days.

(21) Appl. No.: 16/333,335

(22) PCT Filed: Sep. 13, 2017

(86) PCT No.: PCT/GB2017/052689
§ 371 (c)(1),
(2) Date: Mar. 14, 2019

(87) PCT Pub. No.: WO2018/051078
PCT Pub. Date: Mar. 22, 2018

(65) Prior Publication Data
US 2019/0252690 A1 Aug. 15, 2019

(30) Foreign Application Priority Data
Sep. 14, 2016 (GB) .................................. 1615585

(51) Int. Cl.
*H01M 6/40* (2006.01)
*H01M 4/24* (2006.01)
(Continued)

(52) U.S. Cl.
CPC ........... *H01M 6/40* (2013.01); *H01M 4/0402* (2013.01); *H01M 4/0407* (2013.01); *H01M 4/24* (2013.01);
(Continued)

(58) Field of Classification Search
CPC ...................................................... H01M 6/40
See application file for complete search history.

(56) References Cited

U.S. PATENT DOCUMENTS 6,489,053 B1 * 12/2002 Horie .................. H01M 10/058
429/162
8,574,742 B2 11/2013 Zhang et al.
(Continued)

FOREIGN PATENT DOCUMENTS

GB 2477552 A 8/2011
JP 2007-294696 A 11/2007
(Continued)

OTHER PUBLICATIONS

International Search Report of the International Searching Authority dated Dec. 11, 2017, issued in connection with International Application No. PCT/GB2017/052689 (4 pages).
(Continued)

*Primary Examiner* — Haroon S. Sheikh
(74) *Attorney, Agent, or Firm* — McCarter & English, LLP

(57) ABSTRACT

A method of fabricating a flexible battery comprises forming a first substrate on a first release liner, forming at least one current collector layer on each of the first and second substrate, forming an anode side of the battery by forming an anode on the current collector of the first substrate, forming a cathode side of the battery by forming a cathode on the current collector of the second substrate, depositing electrolyte on one or both of the anode and cathode, adhering and sealing the anode side and cathode side together such that the anode and cathode face one another with the electrolyte In between, and removing the flexible battery
(Continued)

from the release liners. The battery may be a primary battery or a secondary battery. The method may be implemented using a roll-to-roll process.

23 Claims, 4 Drawing Sheets

(51) Int. Cl.
*H01M 10/04* (2006.01)
*H01M 6/12* (2006.01)
*H01M 4/583* (2010.01)
*H01M 4/04* (2006.01)
*H01M 4/50* (2010.01)
*H01M 4/42* (2006.01)
*H01M 10/0564* (2010.01)
*H01M 10/052* (2010.01)

(52) U.S. Cl.
CPC .............. *H01M 4/42* (2013.01); *H01M 4/50* (2013.01); *H01M 4/583* (2013.01); *H01M 6/12* (2013.01); *H01M 10/0404* (2013.01); *H01M 10/0436* (2013.01); *H01M 10/0463* (2013.01); *H01M 10/052* (2013.01); *H01M 10/0564* (2013.01); *H01M 2300/0085* (2013.01)

(56) References Cited

U.S. PATENT DOCUMENTS

| | | | |
|---|---|---|---|
| 8,734,980 | B2 | 5/2014 | Tucholski |
| 8,810,996 | B2 | 8/2014 | Lee et al. |
| 9,520,243 | B2 | 12/2016 | Yoo et al. |
| 9,607,771 | B2 | 3/2017 | Park et al. |
| 2003/0219648 | A1 | 11/2003 | Zucker |
| 2005/0260492 | A1 | 11/2005 | Tucholski et al. |
| 2006/0115771 | A1 | 6/2006 | Schubert et al. |
| 2008/0063931 | A1 | 3/2008 | Zucker |
| 2011/0235241 | A1 | 9/2011 | Park et al. |
| 2011/0304955 | A1 | 12/2011 | Zhou et al. |
| 2012/0033347 | A1 | 2/2012 | Eilertsen |
| 2012/0058378 | A1 | 3/2012 | Lee et al. |
| 2012/0107666 | A1 | 5/2012 | Bailey et al. |
| 2012/0170171 | A1 | 7/2012 | Lee et al. |
| 2012/0206887 | A1 | 8/2012 | Tucholski |
| 2012/0208071 | A1 | 8/2012 | Li |
| 2014/0014403 | A1 | 1/2014 | Miller et al. |
| 2015/0235778 | A1 | 8/2015 | Yoo et al. |
| 2016/0054593 | A1 | 2/2016 | Flitsch et al. |
| 2017/0194105 | A1 | 7/2017 | Zhamu et al. |
| 2017/0294659 | A1* | 10/2017 | Kim ..................... H01M 8/1004 |
| 2019/0145161 | A1 | 5/2019 | Agrawal et al. |
| 2019/0371536 | A1 | 12/2019 | Miles et al. |

FOREIGN PATENT DOCUMENTS

| | | |
|---|---|---|
| WO | 2006121917 A1 | 11/2006 |
| WO | 2008096033 A1 | 8/2008 |
| WO | 2010149850 A1 | 12/2010 |
| WO | 2011/017130 A1 | 2/2011 |

OTHER PUBLICATIONS

Written Opinion of the International Searching Authority dated Dec. 11, 2017, issued in connection with International Application No. PCT/GB2017/052689 (8 pages).
Combined Search and Examination Report dated Mar. 21, 2017, issued in connection with UK Application No. GB1615585.5 (6 pages).
Office Action dated Apr. 8, 2021, issued in connection with European Application No. 17787528.3 (6 pages).
PCT International Search Report and Written Opinion dated Feb. 2, 2018, issued in connection with International Application No. PCT/GB2017/052828 (10 pages).
Combined Search and Examination Report dated Feb. 14, 2017, issued in connection with UK Application No. GB1616131.7 (8 pages).
Examination Report dated Apr. 3, 2020, issued in connection with UK Application No. GB1616131.7 (4 pages).
Office Action dated Aug. 20, 2020, issued in connection with U.S. Appl. No. 16/334,078 (9 pages).
Office Action dated Apr. 13, 2021, issued in connection with U.S. Appl. No. 16/334,078 (8 pages).
Office Action dated Mar. 2, 2022, issued in connection with U.S. Appl. No. 16/334,078 (9 pages).
Lee, et al., "All-Solid-State Flexible Supercapacitors by Fast Laser Annealing of Printed Metal Nanoparticle Layers," Journal of Materials Chemistry A: Materials for Energy and Sustainability, vol. 3, No. 16, Jan. 1, 2015, pp. 3339-8345 (8 pages).
MacDonald et al., "Polyester Film Substrates for the Flexible Electronics Industry—An Overview and Where Next," presented at the Association of International Metallizers, Coaters and Laminators (AIMCAL) 2013 Web Coating and Handling Conference USA, Oct. 27-30, 2013, available online at <https://www.aimcal.org/uploads/4/6/6/9/46695933/macdonald_abs.pdf> (8 pages).

* cited by examiner

FLEXIBLE BATTERY

RELATED APPLICATIONS

This application is a U.S. National Phase Application under 35 U.S.C. 371 of International Application No. PCT/GB2017/052689 filed on Sep. 13, 2017, which claims the benefit of United Kingdom (Great Britain) Patent Application No. 1615585.5 filed on Sep. 14, 2016. The disclosures of these applications are incorporated herein by reference in their entireties.

FIELD OF THE INVENTION

This invention relates to a flexible battery and a method of manufacturing the same.

BACKGROUND OF THE INVENTION

A battery is capable of producing electricity through electrochemical reactions between its two electrodes (anode and cathode) in the presence of an electrolyte. Batteries are typically divided into two categories, depending on the nature of the electrochemical reaction taking place within them. Batteries with irreversible chemical reactions are termed as 'primary' and batteries with reversible chemical reactions are termed as 'secondary'; such batteries are also known as 'non-rechargeable' and 'rechargeable' respectively. Non-rechargeable batteries based on $Zn$—$MnO_2$ (alkaline) chemistry are most commonly used in small electronic objects such as toys, remote controls, flashlights etc., whereas rechargeable batteries are commonly based on Li-ion chemistry and used in high end items such as laptops, cellular phones, tablet computers etc. Both non-rechargeable and rechargeable batteries mainly come in cylindrical or cuboid shapes which are not customisable for different applications; this restricts introduction of novel design concepts in the field of electronic product development. There is a need for energy storage devices that do not have the size, weight and form of traditional batteries. Many applications require their batteries to be lightweight, flexible, and as thin as possible so as not to affect the form of the product and/or to fit inside the cavity of a product.

The majority of rechargeable and non-rechargeable thin batteries that are currently available on the market are based on $Zn$—$MnO_2$ (alkaline) and lithium-ion chemistries respectively. These chemistries tend to be used as they comprise inexpensive and recyclable materials and inks containing the active ingredients for forming the active layers only require low temperature curing processes. However, certain components such as electrolytes and some raw materials used in lithium based batteries are flammable and toxic, rendering them hazardous for certain applications. Additionally current collectors for printed lithium based batteries require a high temperature sintering process, which is unfavourable in some cases.

Commercially available thin batteries are somewhat flexible but their capacity and voltage decrease when repeatedly flexed. These batteries are mainly used in radio-frequency identification (RFID) tags, smart cards and temperature sensing strips, but are not appropriate for integration in larger energy storage devices or high power consumption related applications. Furthermore, these batteries do not meet the requirements of a fully formable, scalable, flexible battery for large and small applications. One reason why these batteries are unsuitable for this application is their construction, which uses metal foils and plastic substrates to form the electrodes and the packaging.

Using printed materials, including printed packaging, electrodes and electrolyte, a battery with the kind of unidirectional flexibility, lightweight body, and scalable production, which can be produced in both small and large design can be achieved.

US 2006/0115717 A1 describes a method for printing flexible batteries; both the electrodes are printed but the substrates used for printing those electrodes are based on plastic which leads to a semi-flexible battery.

US 2008/0063931 A1 describes printed batteries manufactured in a layered fashion on paper and polyester film substrates; the cells are based on $Zn$—$MnO_2$ chemistry but fail to display the characteristic voltage of 1.5 V.

US 2005/0260492 A1 describes a printed battery with Zn-foil anode and a printed $MnO_2$ cathode; batteries developed in this manner are not fully printable as one of the electrodes is based on metal foil.

U.S. Pat. No. 8,574,742 B2 describes printed batteries based on $Zn$—$MnO_2$ chemistry using anode and cathode inks deposited onto non-conductive flexible plastic substrates; the inks for depositing electrode materials are mixed with a commercially available carbon paste in order to increase their electrical conductivity and current collection efficiency. It is reported in this publication that the majority of printed electrodes with high electrical conductivity either broke or became electrically resistive upon flexing.

It is evident from the prior art that the efforts for making a highly flexible printed battery have been unsuccessful so far as no disclosure offers a fully printable battery comprising all of the layers printed on top of each other, whilst being highly flexible, and with a performance comparable to standard primary or secondary batteries

STATEMENTS OF THE INVENTION

Aspects of the invention are defined in the accompanying claims.

Embodiments of the present invention relate to fully printable batteries including but not limited to primary batteries which can be manufactured via a roll-to-roll process, in any shape or size, and maintaining flexibility. These batteries may be rolled or folded very easily, having maximum surface area but occupying less space, which is ideal for use in high capacity energy storage systems. Such batteries are suitable for most conventional and unconventional electronic devices with specific design requirements, such as grafting batteries onto resilient and highly flexible materials such as textiles or human skin. It is important that the grafted batteries can mimic the physical characteristics of their host materials such as textile or human skin; such batteries can be stretched or bent at the same rate as their host without affecting their electrochemical properties and performance. In a textile-based wearable device these batteries and the textile material may be indistinguishable from each other; the result is an electronic device that may cause little or no discomfort or distinctive sensation to the wearer.

DETAILED DESCRIPTION

Figure 1:
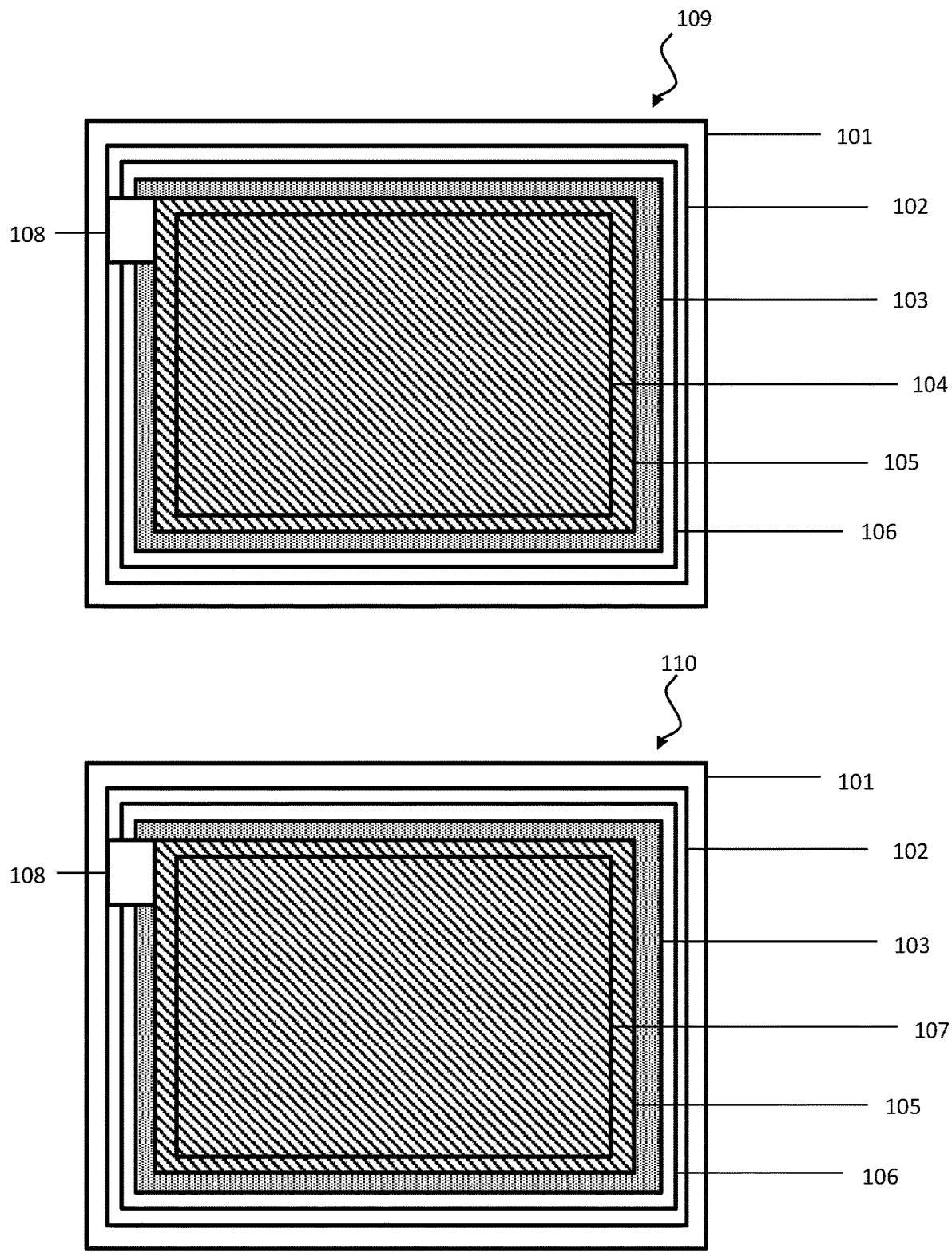
FIG. 1 shows a diagram of a fully printable, flexible battery according to an embodiment of the present invention.

FIG. 1 shows a diagram of a fully printable, flexible battery containing two electrodes, the anode 104 and cathode 107, and an electrolyte 105 according to an embodiment of the present invention. The flexible battery and components may be fabricated using conventional printing techniques including, but not limited to, screen printing, flexographic printing, stencil printing, slot dye-coating, bar coating and rotogravure printing. The fabrication process may be used to fabricate either a primary or secondary battery.

Said batteries may demonstrate a superior flexibility due to the use of a highly flexible substrate 102, printed electrodes 104, 107, and a gel electrolyte 105.

The anode side 109 of the battery may comprise a printed non-conductive substrate 102, a printed current collector layer 103, an anode 104, and an electrolyte 105. The cathode side 110 of the battery may comprise a second printed non-conductive substrate 102, a printed current collector layer 103, a cathode 104, and an electrolyte 105.

The anode side 109 of the battery and the cathode side 110 of the battery may be sealed together using an adhesive 106.

An optional separator may be placed between the anode and cathode prior to sealing the anode side 109 and cathode side 110 of the battery together.

External electrical contacts 108 may be connected to the current collector layers 103 for connecting the battery to an external device.

The following sections describe, in more detail, the battery components and fabrication procedures.

Substrate

Fully printable batteries may be fabricated on a printed, non-conductive, substrate 102, formed on a release liner 101. The substrate may be a flexible polymer substrate.

The substrate 102 may be made of a film forming polymer and be deposited onto the release liner 101 using conventional printing techniques which may include but are not limited to screen printing, flexographic printing, stencil printing, bar coating, rotogravure printing, slot dye coating and any other suitable printing techniques known in the art.

Forming the substrate on a release liner may provide the ability to prepare the substrate with properties designed to fit the required application without wasting material by cutting substrate shapes from a conventional pre-formed sheet.

The printed polymeric film may then be cured appropriately, by apparatuses and techniques which may include but are not limited to a thermal oven, infrared energy source, actinic radiation, photonic curing or any other suitable curing/drying techniques known in the art.

It may be necessary to print multiple layers of the substrate material on top of each other to form a layer that is suitably thick, robust and that does not contain small holes or defects. Failure to do this may result in a substrate that does not prevent ingress of material that might harm the operation of the battery, or allow some or all of the contents of the battery to spill out. The printed material should be capable of forming a robust film which can act as a substrate for the deposition of active layers (current collectors, electrodes, electrolyte etc.) in a sequential manner on each electrode side.

The printed substrate 102 may be a flexible and robust structure capable of undergoing numerous flex cycles without performance degradation. The flexible substrate may be suitable for deposition of one or more layers of active material necessary for fabricating individual battery electrodes. The substrate may be chemically inert so that it does not react with the chemicals present in other deposited layers, the electrolyte or dissolved/ambient gases

Current Collector

A current collector ink may be printed on the substrate film to form a current collector layer 103 before depositing subsequent layers of active materials (electrodes, electrolyte etc.). The current collector layer 103 may be flexible.

The current collector layer may be formed by depositing the current collector ink, which may be a conductive ink. The conductive ink may be deposited using conventional printing techniques which may include but are not limited to screen printing, flexographic printing, stencil printing, bar coating, rotogravure printing, slot dye coating and any other suitable printing techniques known in the art. Following the deposition of the conductive ink, the deposited layer may be cured/dried, thus forming the current collector layer 103.

The deposited layer may be cured-dried to form the current collector layer using apparatuses and techniques which may include but are not limited to a thermal oven, infrared energy source, actinic radiation, photonic curing or any other suitable curing/drying techniques known in the art.

The current collector ink may be made from, but not limited to, any of carbon-based materials, such as graphite, graphene, carbon black, single-walled nanotubes, multi-walled nanotubes, or any other carbon particle known in the art. The conductive ink may also be made from, but not limited, to metal particles, mixtures of metallic and non-metallic particles, and particles of metal alloys.

The current collector layer 3 may be common for both electrodes (anode 104, cathode 107) as it may act as an electrically conductive under layer for both the anode 104 and cathode 107, facilitating charge collection and transfer processes occurring at the anode 104 and cathode 107 respectively.

By way of example only, dried current collector layer films produced from a modified conductive carbon ink may demonstrate electrical resistance between 15-20$\Omega$, which is adequate for charge extraction from the anode 104, and charge transfer to the cathode 107.

In some embodiments it may be advantageous to add a wetting agent to the substrate 102 to aid adhesion and accurate deposition of the current collector ink. Wetting agents or mixtures of wetting agents may include but are not limited to ethylene glycol and/or propylene glycol, or other glycol based chemicals.

Anode and Cathode

The anode 104 and cathode 107 layers may each be deposited on a respective current collector layer 103. The anode 104 and cathode 107 may be flexible.

In embodiments the anode 104 will be deposited on a first substrate 102 and current collector layer 103, whilst the cathode 107 will be deposited on a second substrate 102 and current collector layer 103. Both the first and second substrates 102 and current collector layers 103 may correspond to any of the substrates 102 and current collector layers 103 described previously.

The first substrate 102 and current collector layer 103 upon which the anode 104 is deposited form at least in part the anode side 109 of the battery, and the second substrate 102 and current collector layer 103 upon which the cathode 107 is deposited form at least in part the cathode side 110 of the battery.

The anode 104 may be made of, but not limited to, zinc, nickel or aluminium. The cathode 107 may contain at least one of the following, but not limited to, $\alpha$-$MnO_2$, $\lambda$-$MnO_2$, $TiO_2$, todorokite, zinc-hexacyanoferrate, copper-hexacyanoferrate, spinel-$Mn_2O_4$, nickel-hexacyanoferrate, carbon nanotubes, graphite, and graphene. The electrode materials may be used to fabricate primary or secondary batteries.

Active materials for making the electrodes may be formulated into inks with adjustable viscosities and active material concentrations. The inks for manufacturing the anode may contain powdered metal with particle sizes between 1-50 micrometres, advantageously 5-25 micrometres, and more advantageously 10-15 micrometres in a polymer binder as a primary component; the cathode inks may contain either one or a mixture of the above described compounds dispersed in a polymer binder.

It is important to select a polymer binder that maintains the solid and liquid contents of the ink in a homogeneous mixture; to do so it may be necessary that the inks further comprise dispersion agents or solvents. It is also advantageous that the binder is hydrophobic as this minimises the rate of self-discharge in the fabricated batteries.

The anode and cathode may be formed by depositing anode and cathode inks using conventional printing techniques including, but not limited to, screen printing, flexographic printing, stencil printing, bar coating, rotogravure printing and slot dye printing and other suitable printing techniques known in the art.

In some embodiments, the deposited anode and cathode inks may be cured using techniques such as but not limited to thermal, infrared or photonic curing techniques or exposure to actinic reaction, as well as other suitable curing/drying techniques known in the art.

The shape and thickness of the electrodes 104, 107 may be tailored to meet the requirements of the cell, or to improve productivity during production, for instance, by reducing waste.

Electrolyte

The electrolyte 105 may be deposited on the anode 104 and/or cathode 107 (electrodes), or on a separator (discussed subsequently), or both the electrodes and the separator. The electrolyte 105 may be an electrolyte gel.

For both primary and secondary batteries the electrolyte 105 may contain a water soluble polymer, such as but not limited to polyvinyl alcohol, in an aqueous solution, or a non-aqueous solvent with a suitable polymer. An aqueous electrolyte may include a polymer such as but not limited to polyvinyl alcohol, polyacrylic acid, methyl cellulose or polyethylene oxide.

The electrolyte 105 may contain a salt that contributes metal ions for the electrochemical reactions. The concentration of ions may be a suitable concentration of ions. Advantageously, the concentration of ions in the electrolyte may be kept within 1-10 M for optimised performance.

The electrolyte 105 may be printed directly onto one or both of the anode 104 and cathode 107 before they are placed together and sealed during the battery fabrication process.

The electrolyte 105 may be deposited onto one or both of the anode 104 and cathode 107 using conventional printing techniques which may include but are not limited to screen printing, flexographic printing, stencil printing, bar coating, rotogravure printing, slot dye coating and any other suitable printing techniques known in the art.

Separator

Optionally, a very thin, permeable separator may be placed between the anode 104 and cathode 107 during the fabrication process, before the anode side 109 of the battery and the cathode side 110 of the battery are placed together and sealed.

The separator may be a semipermeable membrane that allows the electrolyte ions to diffuse through but keeps the anode 104 and cathode 107 from touching.

The material from which the separator is made may be very thin and flexible to ensure the presence of the separator does not impact upon the lightweight and highly flexible nature of the battery. The separator can be made from any suitable material, including but not limited to filter paper and polypropylene film.

If a separator is used it is also possible to coat it with the electrolyte during construction instead of, or as well, as coating the electrodes with the electrolyte.

Adhesion and Sealing of the Anode Side and Cathode Side

The anode side 109 of the battery and cathode side 110 of the battery with the electrolyte 105 in place on the respective electrodes 104, 107, and with or without the optional separator, may be stuck together and sealed using an adhesive 106, with the electrolyte 105 in the middle. The adhesive 106 may be an adhesive that quickly forms a strong flexible seal, such as but not limited to an adhesive with a snap cure, fast thermal cure, UV cure or a pressure sensitive cure. The adhesive 106 may be any adhesive known in the art, including but not limited to epoxy based adhesive, silicone adhesives and cyanoacrylates.

The adhesive 106 may be used to achieve a flexible, air-tight seal leaving only the external electrode terminals of the electrodes outside, for making the external electrode contacts 108.

External Electrical Contacts

External electrode terminals for forming external electrical contacts 108 may be made to fit the nature of the application. It may be advantageous that the external electrode terminals are robust enough to form reliable contacts with an electrical device even after several connection/disconnection cycles.

It may be advantageous to form the external electrical contacts using a robust, electrically conductive material such as a metal particle ink containing, for example but not limited to, silver or nickel, or mixtures thereof. The metal particle ink may be printed to form the external electrical contacts. The external electrical contacts 108 may be printed using a silver based ink.

It may be advantageous to use a highly conductive aluminium or copper tape attached to the positive and negative terminals of the battery.

Removal from Release Liner

Following the battery fabrication process, the fabricated flexible battery may be removed from the release liner.

In some embodiments the external electrical contacts 108 may be applied before removal of the battery from the release liner 101, whilst in other embodiments the external electrical contacts 108 may be applied after removal of the battery from the release liner 101.

Fabrication

Figure 2:
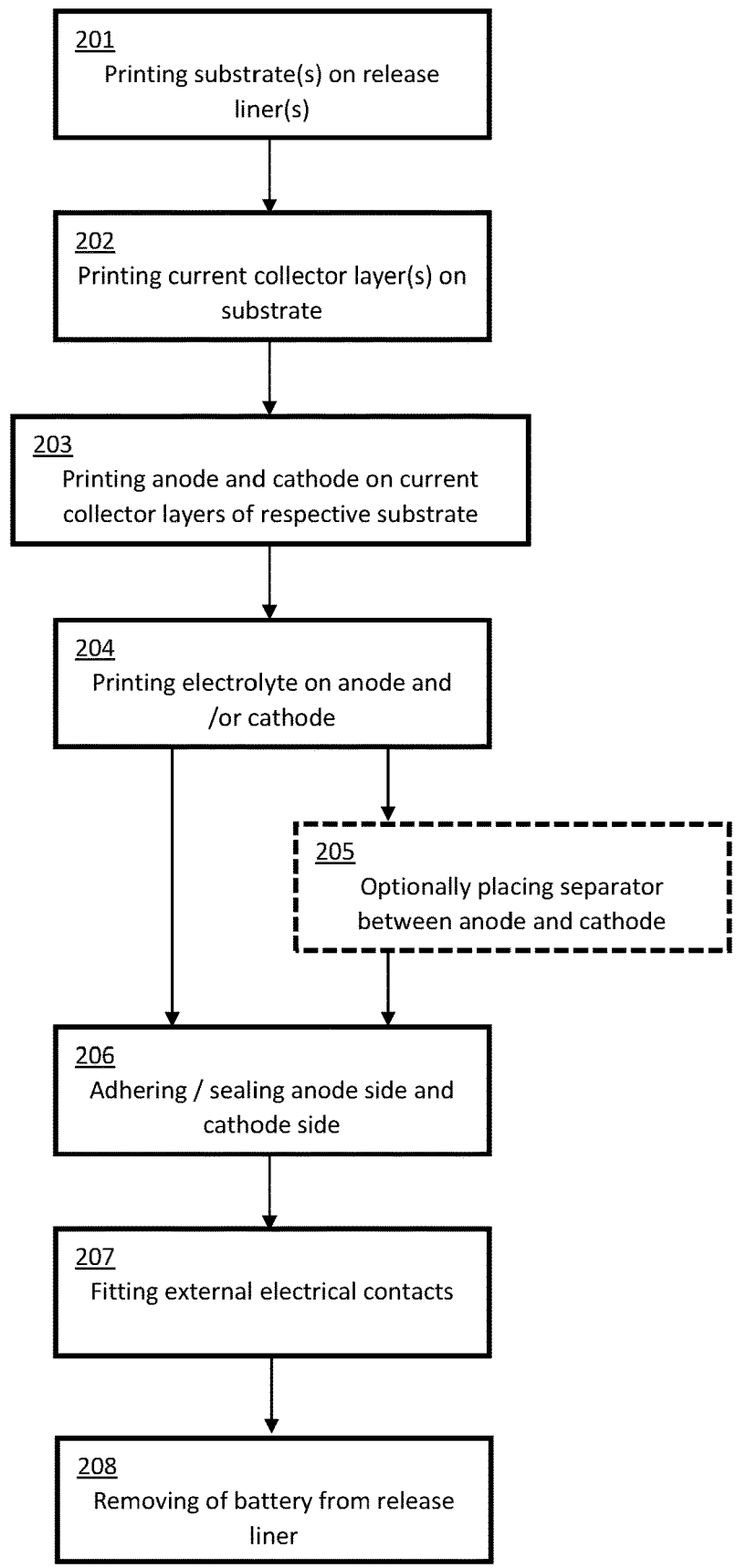
FIG. 2 shows a typical fabrication method for a battery according to embodiments of the present invention.

FIG. 2 represents a typical fabrication method for a battery according to embodiments the present invention.

At step 201 substrate(s) are printed onto release liner(s), as previously detailed in the 'Substrate' section.

At step 202 current collector layer(s) are printed onto the substrate(s), as previously detailed in the 'Current Collector' section.

At step 203 the anode and cathode are printed on the current collector layers of respective substrates, as previously detailed in the 'Anode and Cathode Section'.

At step 204 the electrolyte is printed onto the anode and/or cathode, as previously detailed in the 'Electrolyte' section.

At optional step 205, a separator is optionally placed between the anode and cathode, as previously detailed in the 'Separator' section.

At step 206 the anode side and cathode side of the battery are sealed together, with or without the optional separator, as previously described in the 'Adhesion and Sealing of the Anode Side and Cathode Side' section. The electrode terminals may be left exposed.

At step 207 external electrical contacts are fitted, as previously described in the 'External Electrical Contacts' section.

At step 208 the fabricated flexible battery is removed from the release liner. In some embodiments the external electrical contacts may be fitted following the removal of the battery from the release liner.

Roll-to-Roll Fabrication

Figure 3:
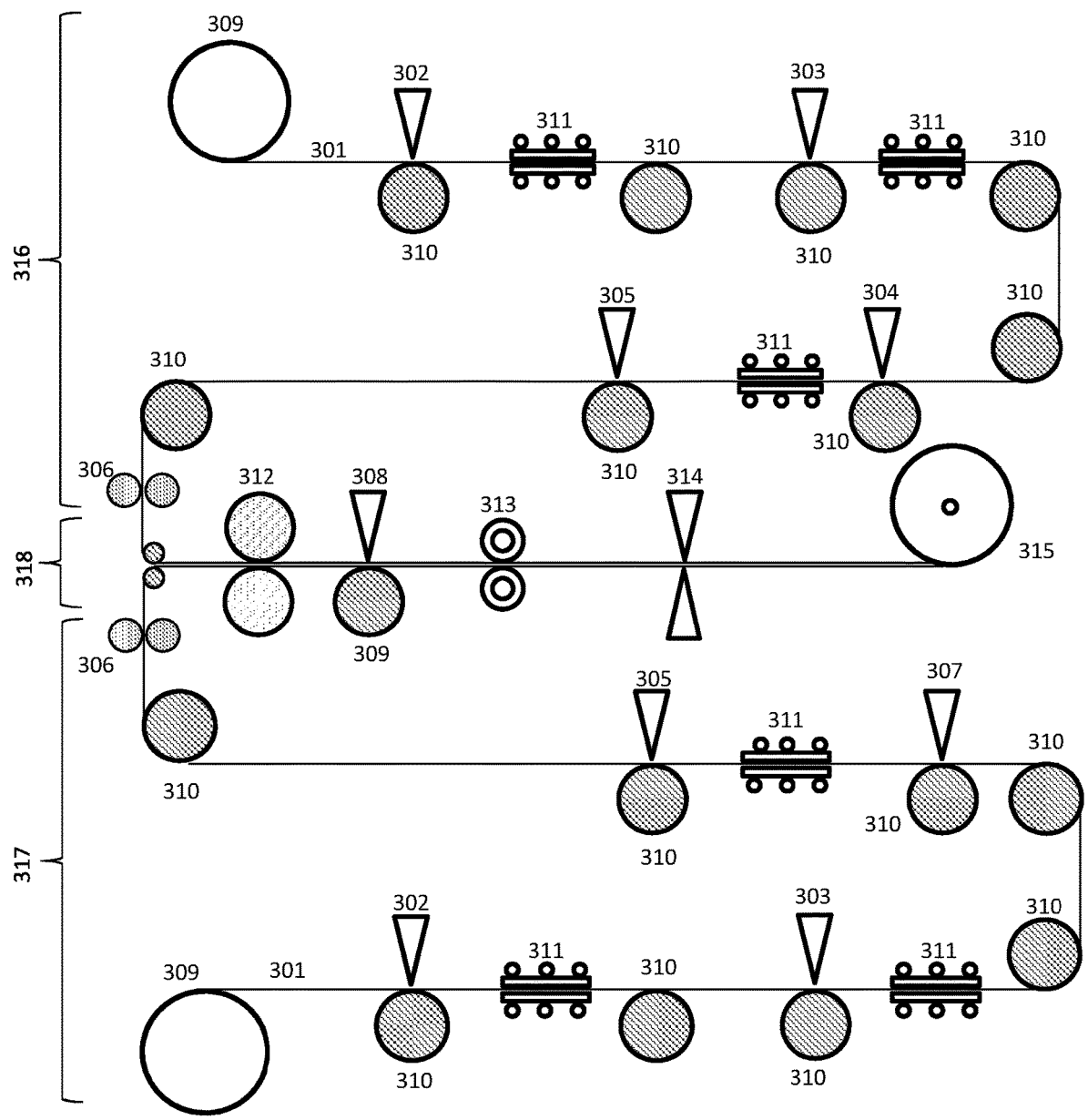
FIG. 3 shows a roll-to-roll process for fabricating a fully printable, flexible battery according to embodiments of the present invention.

FIG. 3 describes a roll-to-roll process which may implement the fabrication technique described previously (with regard to the description of FIG. 2), according to embodiments of the present invention.

The process may be used to fabricate fully printed batteries on a roll-to-roll production line through a continuous process.

The two sides of the battery (anode side and cathode side) may be printed on two separate lines (line one 316 and line two 317) respectively followed by their assembly on a third line 318.

Line one 316 and line two 317 may each contain four printers 302, 303, 304, 305, which may be screen printers, or any other type of printer described in the present document or known in the art, and three ovens 311, which may be near infrared ovens, or any other type of oven or heater suitable for the carrying out the drying/curing techniques described in this document, or known in the art. The printers 302, 303, 304, 305 and ovens 311 are used in order to achieve the sequential deposition of the active materials of the battery.

Line one 316 may begin with a continuous supply of release liner 301 feeding onto a conveyer belt 310 from a feeder 309. In an embodiment a polymer precursor may be screen printed onto the release liner 301 by a first printer 302. In other embodiments the polymer precursor may be printed by any of the other methods described in the 'Substrate' section of the present document. In an embodiment the printed wet coating may then be passed through a first near-infrared oven 311 for rapid curing of the flexible polymer substrate. In other embodiments the printed polymer may be cured/dried by other methods described in the 'Substrate' section of the present document, applied in-line along the conveyer belt roll-to-roll production line.

In an embodiment, following curing a second printer 303 may be used to print a layer of conductive current collector ink, which may be carbon based, onto the dried flexible substrate. The carbon based current collector ink may then be dried in-line using a second near-infrared oven 311 to form the current collector layer. In other embodiments the current collector ink, printing technique, and drying/curing technique may correspond to any of those described in the 'Current Collector' section of the present document, applied in-line along the conveyer belt roll-to-roll production line to form the current collector layer.

In an embodiment, following drying/curing the current collector layer, at a third printer 304 an anode ink may be screen printed onto the current collector layer, on the flexible substrate and dried/cured by passing through a third near infrared oven. In other embodiments the anode ink, printing/deposition technique and curing technique may correspond to any of those detailed in the 'Anode and Cathode' section of the present document, applied in-line along the conveyer belt roll-to-roll production line to form the anode.

In an embodiment, following the drying/curing of the anode, at a fourth printer 305 an aqueous electrolyte gel may be screen printed onto the dried anode. In other embodiments the electrolyte and printing/deposition technique may correspond to any of those detailed in the 'Electrolyte' section of the present document, applied in-line along the conveyer belt roll-to-roll production line.

Line two 317 may follow similar processes to any of those describe in relation to line one 316, only with the anode ink replaced by a cathode ink, corresponding to that described in the 'Anode and Cathode' section of the present document. Line one 316 and line two 317 may operate simultaneously to fabricate the anode and cathode sides of the battery, Following the deposition of the electrolyte on line one 316 (anode side) and line two 317 (cathode side) the two lines are redirected to line three 318, the assembly line. Before assembly the anode side and cathode side may each be passed through in-line adhesive dispensers 306 to apply a thin adhesive layer along the boundaries of the anode and cathode sides in order to achieve an air tight seal at the end of the assembly process. The adhesive may correspond to any adhesive described in the 'Adhesion and Sealing of the Anode Side and Cathode Side' section above, applied in-line along the conveyer belt roll-to-roll production line.

In an embodiment the anode side and cathode side may be placed on top of each other, with the electrolyte in between, to form the sealed device, and passed through a pair of pressure rollers 312 in order to achieve a stronger seal. In other embodiments, in addition to or instead of passing through the pressure roller 312, the adhesive may be dried/cured, and the device sealed using any of the techniques described in the 'Adhesion and Sealing of the Anode Side and Cathode Side' section above, applied in-line along the conveyer belt roll-to-roll production line to form the sealed device. The electrode terminals may be left exposed.

In some embodiments, prior to sealing the device, a separator may be placed between the anode and cathode sides. The separator may correspond to any separator described in the 'Separator' section above.

In an embodiment the sealed device may then be passed through a printer 308 to print metallic ink for making electrical contacts on both the anode and cathode ends of the battery. The printer 308 may be a screen printer or any other suitable type of printer used for depositing metal ink as known in the art.

In an embodiment, following printing the metallic ink to make electrical contacts, the device may be encapsulated using a hermetic membrane 313.

In an embodiment, the encapsulated flexible battery device, in the form of a long sheet, may then be cut at predetermined lengths using a cutter 314 and wrapped around a collection reel 315.

In embodiments, the flexible battery may be removed from the release liner 301 after or before wrapping around the collection reel 315.

Example Fabrication

By way of non-limiting example, a flexible battery may be fabricated by the following method.

A printed primary battery based on Zn—$MnO_2$ chemistry was prepared using flexible polymer substrates. Flexible polymer substrates were used for making both the anode and cathode for the battery. In this example an amine based polymeric material was used as a precursor for preparing the flexible substrates. The substrates were of approximately 50 microns thickness and printed onto two separate release liners using a screen printing technique. The printed substrates were then cured in a convection oven at 120° C. for 15 minutes followed cooling to room temperature. Next the current collection layers were formed by depositing approximately 15 microns in thickness of carbon based ink on both substrates using a screen printing technique. The carbon based current collection layer was cured at 90° C. for 15 minutes and allowed to cool to room temperature. This was followed by screen printing anode and cathode inks, of approximately 20 microns thickness, on each substrate, respectively. The anode ink was prepared by mixing 50 wt % Zn powder with a PVDF binder in the presence of 1 wt % $Bi_2O_3$ and 0.5 wt % ZnO as additives. 5 wt % carbon black powder was also added to the anode ink formulation before stirring the mixture at 2500 rpm for two hours. The cathode ink was also prepared in the same manner by adding 80 wt % $MnO_2$, 2 wt % ethylene glycol and 5 wt % carbon black to a PVDF binder followed by stirring the mixture at 2500 rpm for one hour.

The as-printed anodes and cathodes were then dried at 120° C. for 10 minutes and allowed to cool to room temperature. A thin layer of gel electrolyte was then deposited on the electrodes. The gel electrolyte was made from 6 N $ZnCl_2$ in 30 wt % aqueous PVA. The assembly process was then finished by quickly applying a flexible epoxy based glue to the edges of the electrodes to seal the battery, leaving the electrode terminals exposed. A silver based ink was used to print electrical contacts onto the exposed terminals. The as-formed batteries were then removed from their release liners in order to obtain a fully printable and extremely flexible battery.

Example Battery Shapes

Figure 4A:
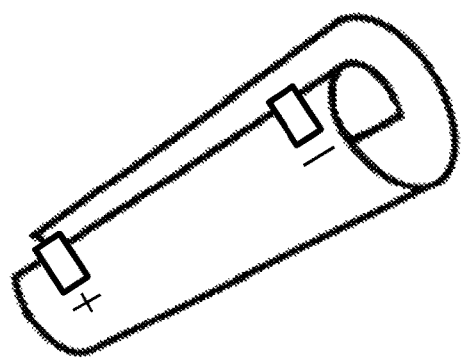
FIGS. 4A to 4D show flexible batteries formed in various shapes according to embodiments of the present invention.

FIG. 4A shows an embodiment of the flexible battery in which the battery takes the form of a rolled up sheet.

Figure 4B:
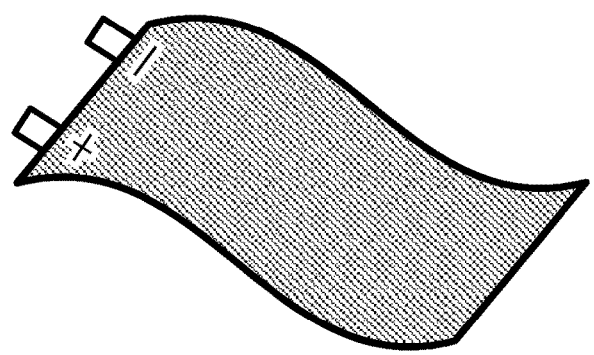

FIG. 4B shows an embodiment of the flexible battery in which the battery takes the form of a flexible sheet.

Figure 4C:
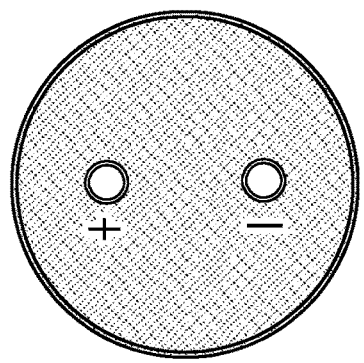

FIG. 4C shows an embodiment of the flexible battery in which the battery takes the form of a circular shape.

Figure 4D:
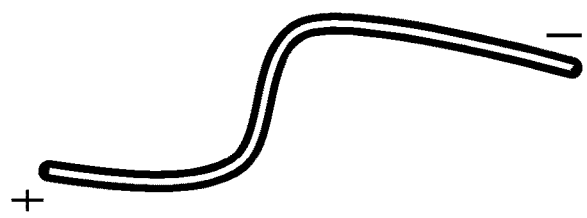

FIG. 4D shows an embodiment of the flexible battery in which the battery takes the form of a ribbon.

Alternative Embodiments

Any combination of features, from any embodiment as described previously, may be used in combination and fall within the scope of the present invention.

Alternative embodiments may be contemplated on reading the above disclosure, which may nevertheless fall within the scope of the invention as defined by the accompanying claims.

The invention claimed is:

1. A method of fabricating a flexible battery, the method comprising:
   a. forming a first substrate on a first release liner and a second substrate on a second release liner;
   b. forming at least one current collector layer on each of the first and second substrates;
   c. forming an anode side of the flexible battery by forming an anode on the current collector layer of the first substrate;
   d. forming a cathode side of the flexible battery by forming a cathode on the current collector layer of the second substrate;
   e. depositing an electrolyte on one or both of the anode and cathode;
   f. adhering and sealing the anode side and the cathode side together such that the anode and cathode face one another with the electrolyte in between, leaving electrode terminals exposed for connection; and
   g. removing the flexible battery from the release liners.

2. The method of claim 1, wherein the first and second substrates are formed by printing substrate material onto the first release liner and the second release liner respectively.

3. The method of claim 2, wherein the printed substrate material is a film forming polymer.

4. The method of claim 2, wherein the printed substrate material is cured following printing.

5. The method of claim 1, wherein the current collector layers are formed by printing current collector ink on the first substrate and second substrate.

6. The method of claim 5, wherein the printed current collector ink is cured or dried to form the current collector layers.

7. The method of claim 1, wherein the current collector layers are made from carbon-based materials.

8. The method of claim 1, wherein the current collector layers are made from at least one of metal particles, mixtures of metallic and non-metallic particles, or particles of metal alloys.

9. The method of claim 1, wherein the anode and cathode are formed by printing.

10. The method of claim 9, wherein the printed anode and cathode are cured.

11. The method of claim 1, wherein the anode is made from at least one of zinc, nickel or aluminium.

12. The method of claim 1, wherein the cathode is made from at least one material selected from the group consisting of $\alpha$-$MnO_2$, $\lambda$-$MnO_2$, $TiO_2$, todorokite, zinc-hexacyanoferrate, copper-hexacyanoferrate, spinel-$Mn_2O_4$, nickel-hexacyanoferrate, at least one carbon nanotubes layer, at least one graphite layer, and at least one graphene layer.

13. The method of claim 12, wherein the cathode is made from ink comprising said at least one material dispersed in a polymer binder.

14. The method of claim 1, wherein the anode is made from ink comprising powdered metal in a polymer binder.

15. The method of claim 14, wherein the powdered metal comprises at least one of zinc, nickel or aluminium.

16. The method of claim 14, wherein the polymer binder is hydrophobic.

17. The method of claim 1, wherein the electrolyte is deposited by printing.

18. The method of claim 1, wherein prior to adhering the anode side and cathode side of the flexible battery, a separator is placed between the anode and cathode.

19. The method of claim 18, wherein the separator is a thin, semipermeable membrane.

20. The method of claim 18, wherein prior to placing the separator between the anode and cathode, the separator is coated in electrolyte.

21. The method of claim 1, comprising the steps of cutting the flexible battery at a predetermined length and wrapping the flexible battery around a collection reel.

22. The method of claim 21, wherein the step of removing the flexible battery from the release liners is performed before the step of wrapping the flexible battery around the collection reel.

23. The method of claim 21, wherein the step of removing the flexible battery from the release liners is performed after the step of wrapping the flexible battery around the collection reel.

* * * * *